(12) United States Patent
Goulet et al.

(10) Patent No.: US 8,312,947 B2
(45) Date of Patent: Nov. 20, 2012

(54) POWER TAKE OFF COUPLER AND VEHICLE HITCH EQUIPPED THEREWITH

(76) Inventors: Denis Goulet, Saint-Pierre de Broughton (CA); Louis Lamontagne, Thetford Mines (CA); Serge Fraser, St-Joseph de Colerain (CA)

( * ) Notice: Subject to any disclaimer, the term of this patent is extended or adjusted under 35 U.S.C. 154(b) by 230 days.

(21) Appl. No.: 12/789,650

(22) Filed: May 28, 2010

(65) Prior Publication Data
US 2011/0290570 A1 Dec. 1, 2011

(51) Int. Cl.
*B60K 25/06* (2006.01)
(52) U.S. Cl. ...................................... 180/53.1
(58) Field of Classification Search .............. 464/38, 464/39, 149, 157; 180/53.1, 53.3, 53.61, 180/53.7, 53.8; 172/47, 439; 74/11
See application file for complete search history.

(56) References Cited

U.S. PATENT DOCUMENTS

| | | | |
|---|---|---|---|
| 2,390,908 A * | 12/1945 | Young | 464/39 |
| 2,952,999 A | 9/1960 | Glover | |
| 3,120,746 A | 2/1964 | Kayser | |
| 3,299,979 A * | 1/1967 | Restall | 180/14.1 |
| 3,575,015 A | 4/1971 | Geisthoff et al. | |
| 3,618,340 A | 11/1971 | Geisthoff et al. | |
| 3,703,089 A * | 11/1972 | Geisthoff et al. | 464/135 |
| 4,023,638 A * | 5/1977 | Holmes et al. | 180/14.4 |
| 4,353,705 A | 10/1982 | Scott-Jackson et al. | |
| 4,685,557 A | 8/1987 | Roinestad | |
| 4,843,983 A | 7/1989 | Olson | |
| 4,859,110 A * | 8/1989 | Dommel | 403/325 |
| 4,887,680 A * | 12/1989 | Nozaka et al. | 180/53.3 |
| 5,094,651 A | 3/1992 | Cornay | |
| 5,224,816 A | 7/1993 | Kaczmarczyk et al. | |
| 5,226,853 A | 7/1993 | Courgeon | |
| 5,355,971 A * | 10/1994 | Austin et al. | 180/53.1 |
| 5,389,044 A | 2/1995 | Bandy, Jr. et al. | |
| 6,827,154 B2 * | 12/2004 | Heller | 172/439 |
| 7,104,339 B2 | 9/2006 | Garner | |
| 7,278,502 B2 | 10/2007 | Trefz et al. | |
| 7,334,645 B2 | 2/2008 | Stevenson et al. | |
| 7,575,077 B2 * | 8/2009 | Priepke et al. | 180/53.3 |
| 2008/0115983 A1 * | 5/2008 | Priepke et al. | 180/53.3 |

FOREIGN PATENT DOCUMENTS

| | | |
|---|---|---|
| DE | 36 12 322 A1 | 10/1987 |
| DE | 41 32 889 A1 | 4/1992 |
| DE | 42 13 069 C1 | 9/1993 |
| GB | 1 194 040 A | 6/1970 |
| GB | 2 142 293 A | 1/1985 |

OTHER PUBLICATIONS

English language Abstract of DE 41 32 889.
English language Abstract of DE 42 13 069.
English language Abstract of DE 36 12 322.

* cited by examiner

*Primary Examiner* — Joseph Rocca
*Assistant Examiner* — Robert A Coker

(57) ABSTRACT

The present invention relates to a Power Take Off (PTO) coupler and a hitch equipped with such a PTO coupler. The PTO coupler comprises a power transmission coupler; and a securing mechanism. The securing mechanism is adapted for fixedly securing an extremity of the power transmission coupler to the hitch. The securing mechanism comprises a position adjustment mechanism for allowing planar movement of the power transmission coupler within the securing mechanism. The securing mechanism may further comprise a compression adjustment mechanism for adjusting pressure received by the power transmission coupler.

10 Claims, 10 Drawing Sheets

POWER TAKE OFF COUPLER AND VEHICLE HITCH EQUIPPED THEREWITH

FIELD

The present invention relates to a Power Take Off (PTO) coupler and to a vehicle hitch equipped therewith, and more particularly to a PTO coupler adapted for self-adjustment.

BACKGROUND

Vehicles are used with various types of implements. Implements are typically affixed to the vehicle by means of a hitch. A first part of a hitch is affixed to the vehicle, and a complementary part is affixed to the implement. The part of the hitch on the vehicle may further be designed so as to assist in lifting the implement from a resting position.

In addition to the hitch for allowing lifting and securing of the implement to the vehicle, certain implements require power to function. Power from the vehicle is generally provided to the implement by means of a Power Take Off (PTO) coupler, which is adapted for engaging a power coupler of the implement.

However, precise positioning of the PTO coupler with respect to the power coupler of the implement is not always possible. When the PTO coupler is not precisely aligned with the power coupler of the implement, alignment may not be automatically performed, and/or premature wear is imposed on engagement mechanisms of the PTO coupler and of the power coupler of the implement. Furthermore, during operation of the implement, impact may cause relative movement of the implement with respect to the hitch of the vehicle, resulting in an impact on the engagement mechanisms of the PTO coupler and of the power coupler of the implement, and even disengagement of the PTO coupler.

There is therefore a need for a PTO coupler that alleviates the aforementioned problems.

SUMMARY

The present provides a Power Take Off (PTO) coupler adapted for performing self-adjustment. The PTO coupler comprises a power transmission coupler and a securing mechanism. The securing mechanism fixedly secures an extremity of the power transmission coupler to a hitch. The securing mechanism comprises a position adjustment mechanism for allowing planar movement of the power transmission coupler within the securing mechanism.

In another aspect, the present provides a Power Take Off (PTO) capable of performing self-adjustment. The PTO coupler comprises a power transmission coupler and a securing mechanism. The securing mechanism fixedly secures an extremity of the power transmission coupler to a hitch. The securing mechanism comprises a position adjustment mechanism and a compression adjustment mechanism. The position adjustment mechanism is adapted for allowing planar movement of the power transmission coupler within the securing mechanism. The compression adjustment mechanism is adapted for adjusting pressure and axial movement received by the power transmission coupler.

In yet another aspect, the present relates to a vehicle hitch. The vehicle hitch comprises a frame, a power transmission coupler and a securing mechanism. The frame is adapted to connect with a corresponding hitch of an implement. The power transmission coupler has a first extremity adapted to be affixed to a vehicle shaft, and a second extremity adapted to engage a power mechanism of the implement. The securing mechanism fixedly secures an extremity of the power transmission coupler to the frame, the securing mechanism comprises a position adjustment mechanism for allowing planar movement of the power transmission coupler within the securing mechanism.

BRIEF DESCRIPTION OF THE DRAWINGS

In the following description, the following drawings are used to describe and exemplify the present invention.

DETAILED DESCRIPTION

The industry of vehicles adapted to receive implements, and implements themselves is quite vast. It goes from residential to commercial and industrial applications. Examples of vehicles adapted to receive implements include tractors, trucks, all terrain vehicles and heavy machinery. The variety of implements is very wide; each implement corresponding to a particular task to be performed by the vehicle. Some of those implements require power provided by the vehicle to function. Various types of power may be required by the implement: hydraulic power, pneumatic power, electrical power and motion generated by an engine of the vehicle.

To convey motion generated by the engine of the vehicle, many applications use a Power Take Off (PTO) coupler. The PTO coupler conveys the motion generated by the engine by means of a shaft, to the implement. PTO couplers are sometimes connected to the implement automatically, which oftentimes imposes additional stress to the PTO coupler. Furthermore, during operation, the implement may encounter resistance, which may result in impact on the implement and on the PTO coupler to which it is affixed. The impact may be sufficient to damage the PTO coupler, to disengage the PTO coupler, or to partially disengage the PTO coupler. Thus impact on the implement often results in premature wear of the PTO coupler.

To alleviate these problems, the present provides a PTO coupler capable of self-adjustment. The present PTO coupler is adapted to be installed on a vehicle hitch.

Figure 1:
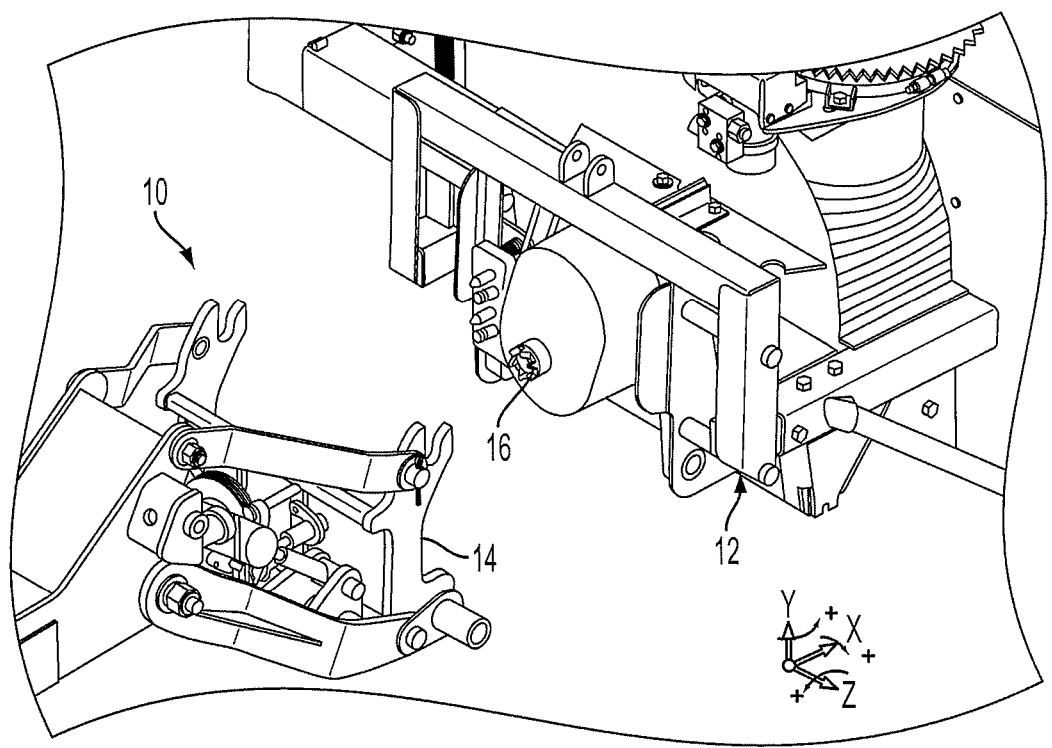
FIG. 1 is a perspective view of a vehicle hitch and implement hitch in disengaged position.

Reference is now made to FIG. 1 which depicts an exemplary perspective view of a vehicle hitch 10 and implement hitch 12 in a disengaged position. Although a three-point hitch system is depicted, such a system is used for exemplary purposes only. The present PTO coupler is not limited for use with such three-point hitch system, and any type of hitch system, capable of providing a PTO coupler, could alternately be used.

As can be appreciated, the vehicle hitch 10 is provided with a frame 14 adapted to be affixed to the implement hitch 12. Upon connection of the vehicle hitch 10 to the implement hitch 12, precise alignment of a PTO coupler (not shown on FIG. 1) to a power mechanism 16 of the implement hitch 12 must be performed.

Figure 2:
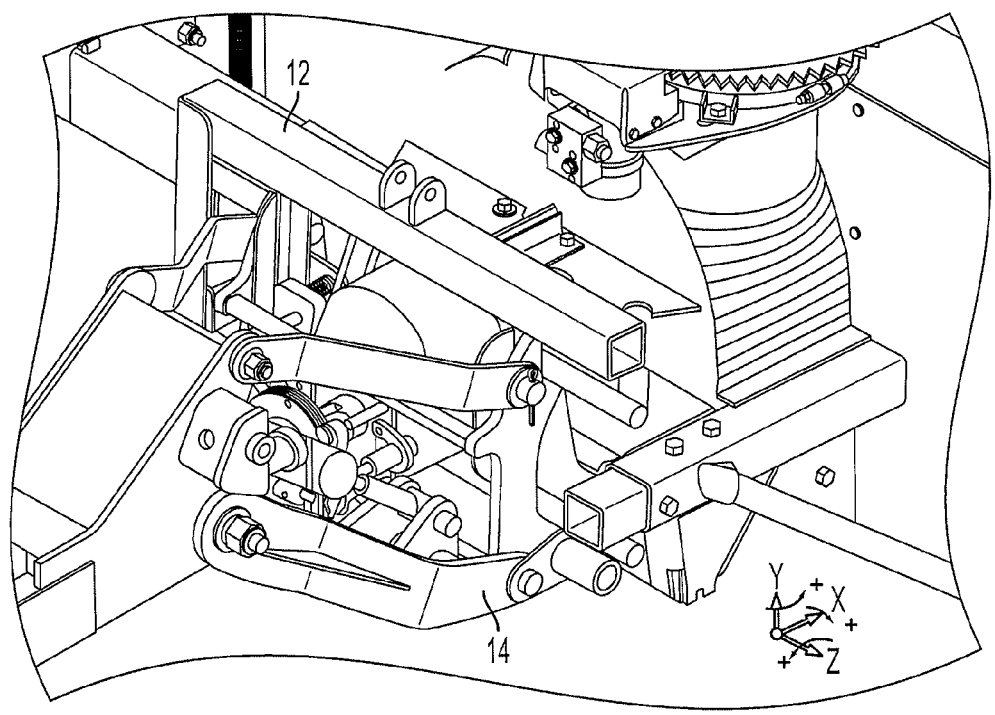
FIG. 2 is a perspective view of a vehicle hitch and implement hitch in engaged position.

Reference is now made to FIG. 2, which is a perspective view of the vehicle hitch 10 and implement hitch 12 in engaged position. As can be appreciated, the vehicle hitch 10 is securely affixed to the implement hitch 12. In some implementations, the vehicle hitch 10 may be automatically affixed to the implement hitch 12 by an operator of the vehicle, without any manual operation. The present PTO coupler thus applies to vehicles and vehicle hitches manually, semi-manually or automatically affixed to the implement hitch 12.

Figure 3:
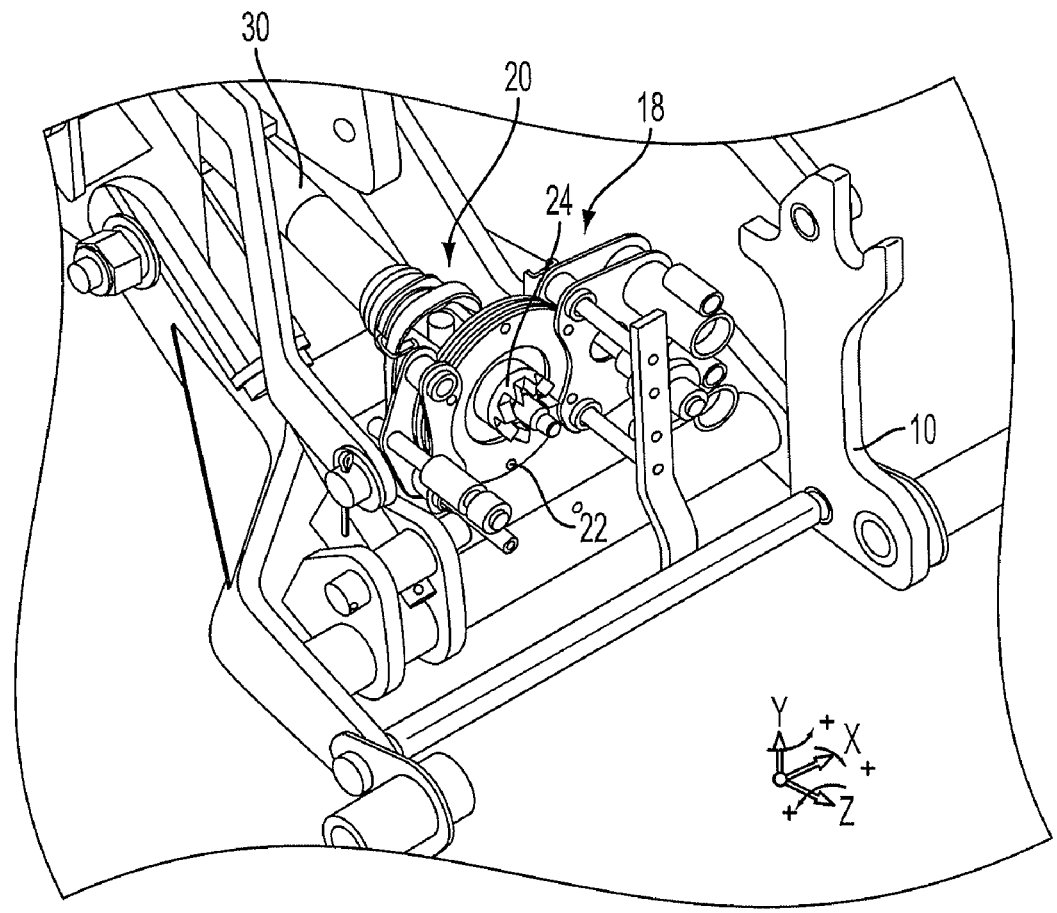
FIG. 3 is a front perspective view of a hitch with the present PTO coupler

Reference is now made to FIG. 3, which is a front perspective view of the vehicle hitch 10 with the present PTO coupler 18. The PTO coupler 18 has a power transmission coupler 20 and a securing mechanism 22. The power transmission coupler 20 has a first extremity (not shown) adapted to be affixed directly or indirectly to a vehicle shaft (not shown). The first extremity may be affixed by any known means, such as for example a universal joint, a combination of flexible shaft and flexible connector, etc. The power transmission coupler 20 has a second extremity 24 adapted to engage the power mechanism 16 of the implement 12.

Figure 4:
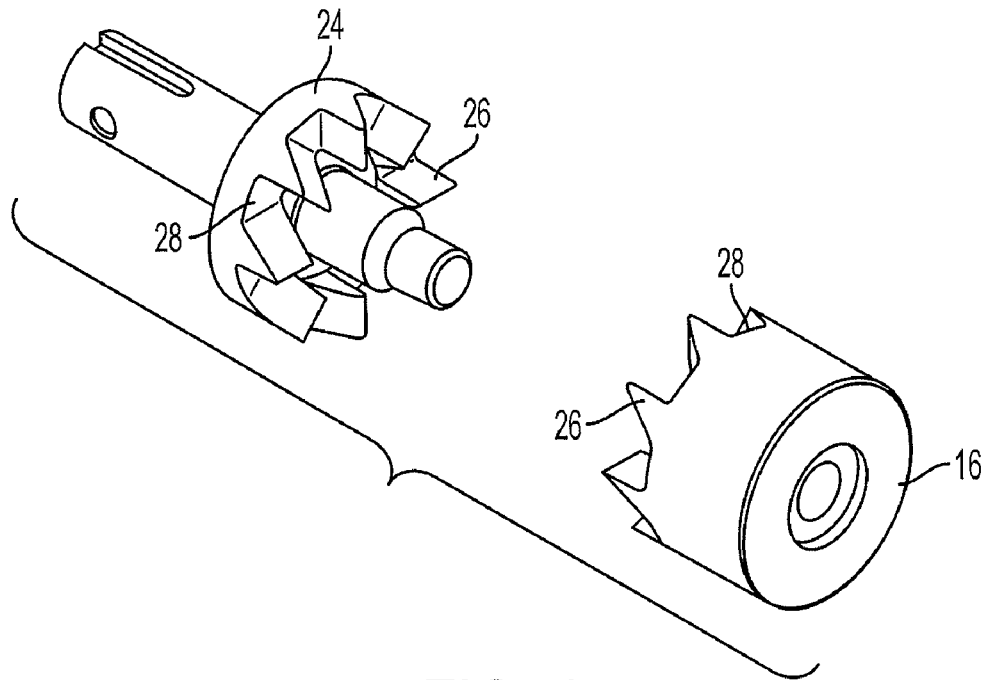
FIG. 4 is a perspective view of an exemplary second extremity of the power transmission coupler and of the power mechanism of the implement in disengaged position.
Figure 5:
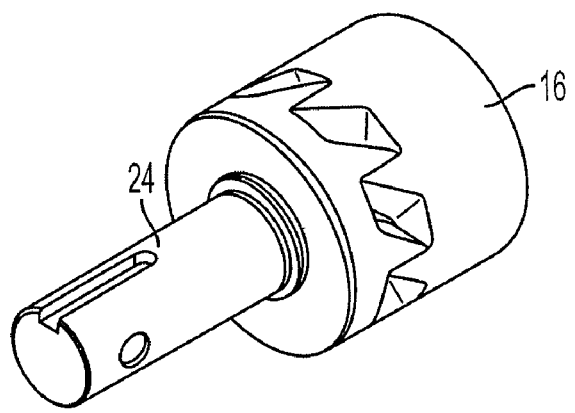
FIG. 5 is a perspective view of an exemplary second extremity of the power transmission coupler and of the power mechanism of the implement in engaged position.

Reference is now made concurrently to FIGS. 4 and 5, which depict perspective views of an exemplary second extremity 24 and power mechanism 16 in respectively disengaged and engaged positions. The second extremity 24 and the power mechanism 16 may be equipped, as shown on FIGS. 4 and 5 with teeth 26, which, upon rotation of the second extremity 24, engage the teeth 26 of the power mechanism 16 of the implement. The second extremity 24 and the power mechanism 16 could also be provided with complimentary bases 28. Other designs of second extremity 24 and power mechanism 16 could alternately be used without departing from the presently claimed PTO coupler. For example, the second extremity 24 and the power mechanism 16 could have different shapes, bear a greater or lesser number of teeth, have teeth shaped differently, etc. However, to ensure optimized functioning, designs of the second extremity 24 of the power transmission coupler 20 and of the power mechanism 16 should be complimentary, and provide engagement there between upon rotation.

Figure 6:
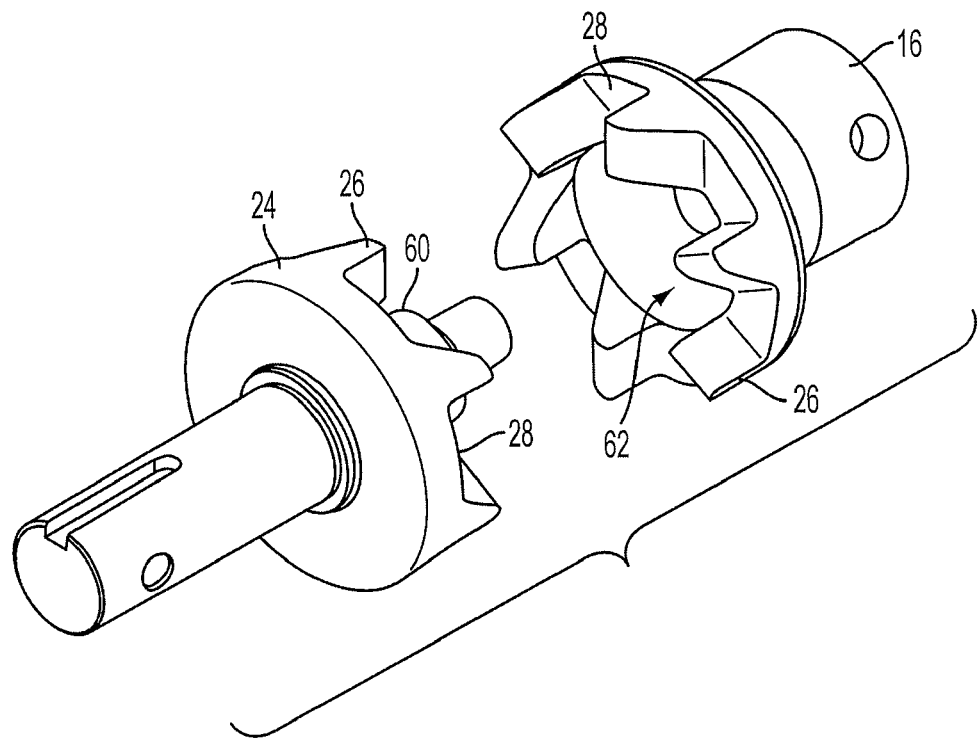
FIG. 6 is another perspective view of an exemplary second extremity of the power transmission coupler and of the power mechanism of the implement.
Figure 7:
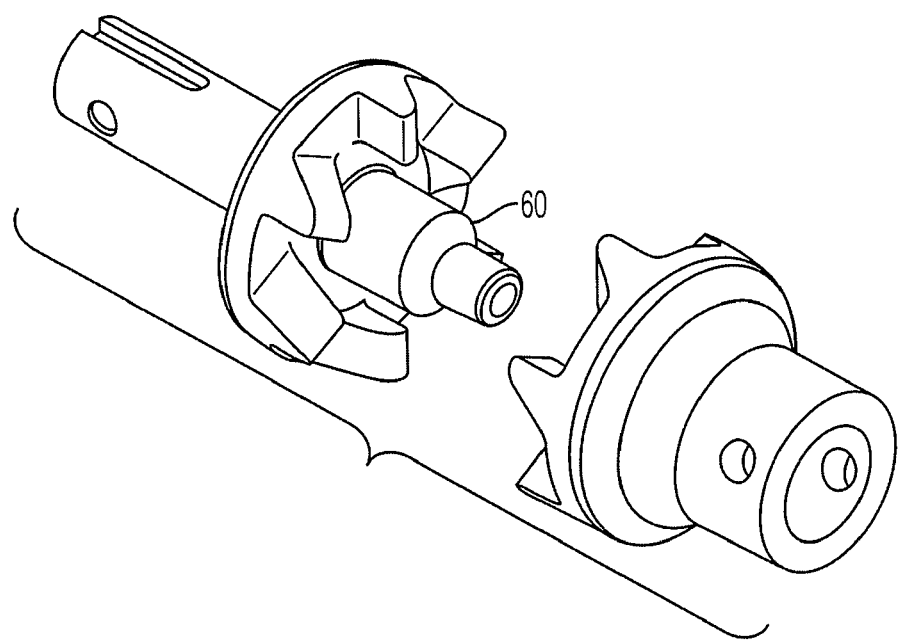
FIG. 7 is yet another perspective view of the second extremity of the power transmission coupler and the power mechanism of the implement of FIG. 6.

Reference is now made to FIGS. 6 and 7, which depict perspective views of an exemplary second extremity 24 of the power transmission coupler 20 and of the power mechanism 16 of the implement. In this aspect, the second extremity 24 is provided with a tapered male connection 60 while the power mechanism 16 is provided with a tapered female connection 62 adapted to receive the tapered male connection 60. In addition to receiving the male connection 60, the female connection 62 assists in adjusting the PTO coupler 18 to the power mechanism 16 of the implement by guiding insertion of the male connection 60 in the female connection 62. Furthermore, to ensure optimal engagement, the teeth 26 of the second extremity 24 and the teeth 26 of the power mechanism 16 do not get in contact with the complimentary bases 28 when the tapered male connection 60 is in contact with the female connection 62, so as to reduce vibration there between. The tapered male connection 60 and female connection 62 thus provide a simple and efficient means for engaging the PTO coupler 18 to the power mechanism 16, and for contributing to the adjustment of the PTO coupler 18 to the power mechanism 16.

In a particular aspect, the taper of the male connection 60 and of the female connection 62 may be proportional to the planar adjustment of the position adjustment mechanism 40. More particularly, the following proportions were implemented and successfully tested on a prototype:

$$\text{radius of the female connection} \geq (2*\text{planar adjustment} + \text{tolerance}).$$

Other proportions could alternatively be used without departing from the scope of the presently claimed PTO coupler.

Figure 8:
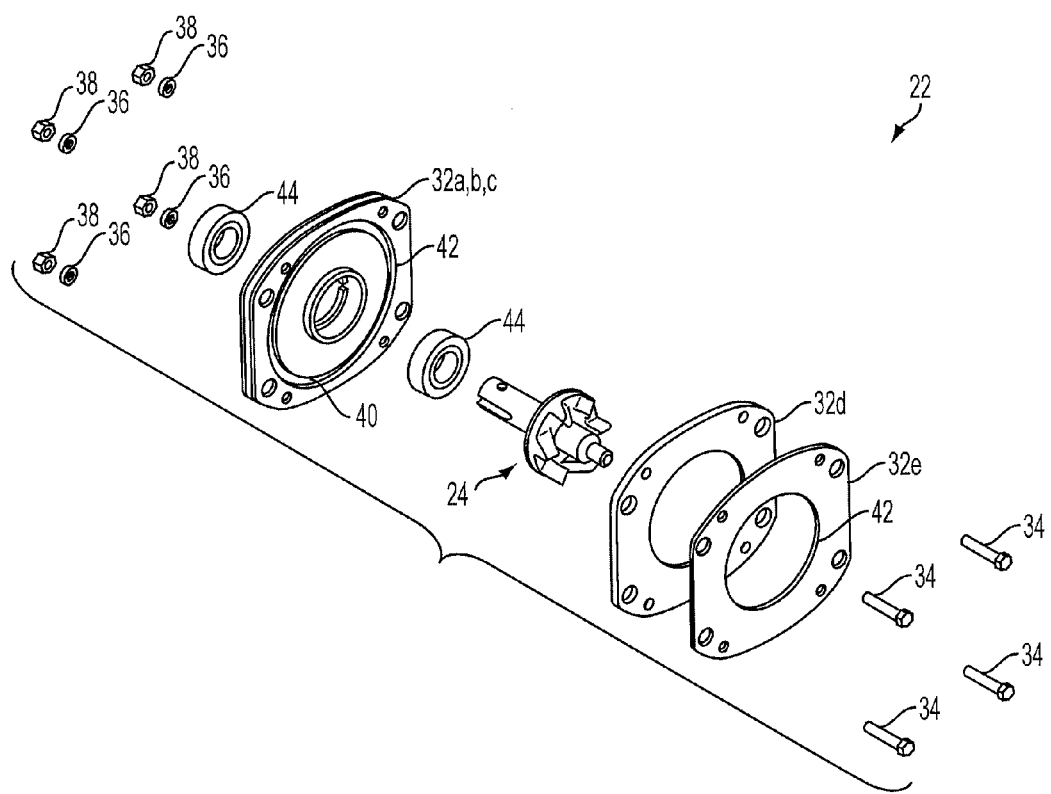
FIG. 8 is a partially exploded view of the present PTO coupler.
Figure 9:
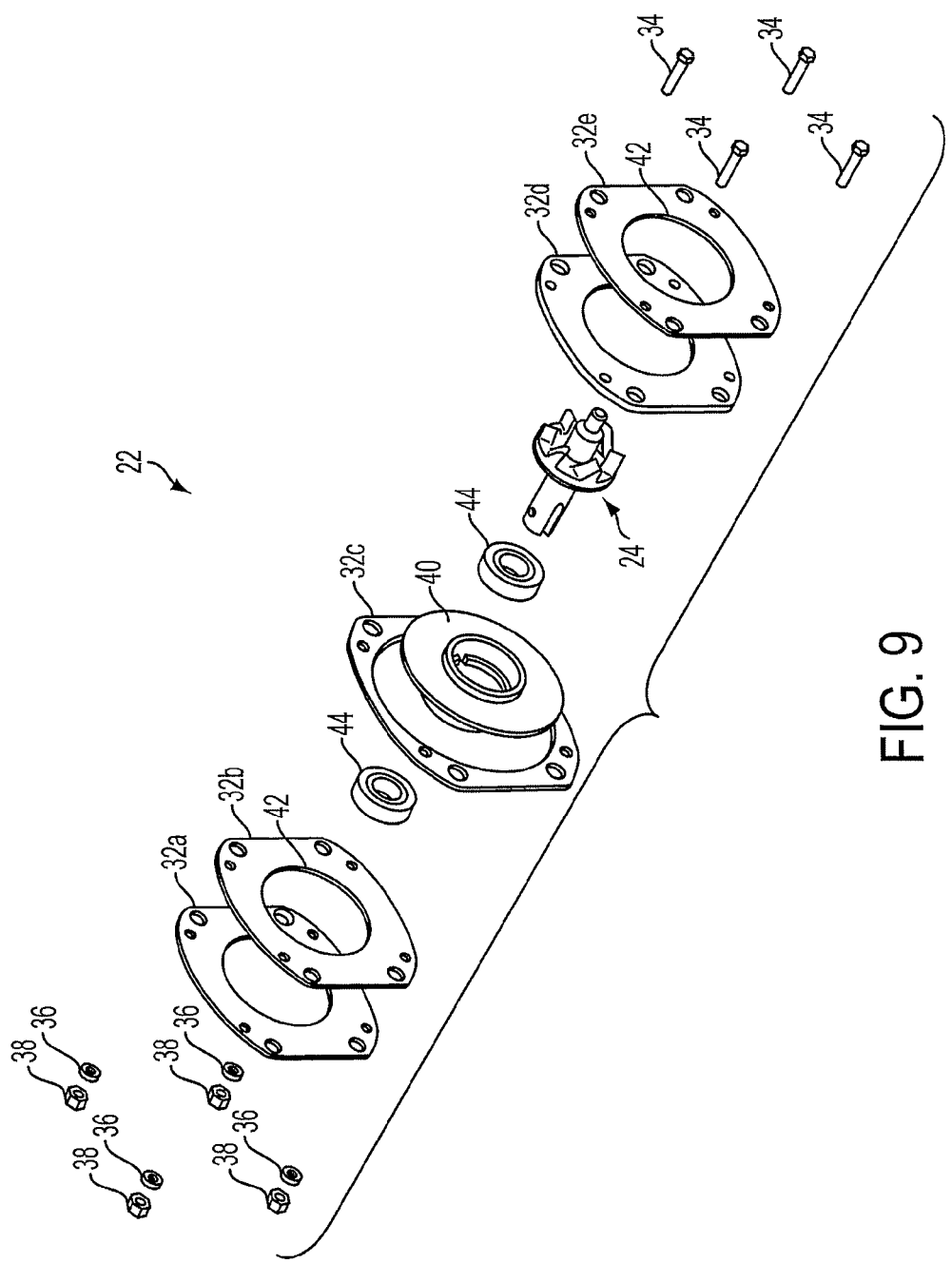
FIG. 9 is a completely exploded view of the present PTO coupler.

Reference is now made to FIGS. 8 and 9, which respectively depict a partially exploded view and fully exploded view of the present securing mechanism 22. The securing mechanism 22 receives the second extremity 24 of the power transmission coupler 20. Although not shown on FIGS. 8 and 9, the second extremity 24 is adapted to be connected to a shaft 30 (as shown on FIG. 3).

The securing mechanism 22 is adapted to be fixedly secured to the frame 14 of the vehicle hitch 10 by means of an affixing structure composed of one or several affixing members 32a, 32b, 32c, 32d and 32e. Each of the affixing members 32a, 32b, 32c, 32d and 32e is adapted to be secured by means of screws 34, lock washers 36 and nuts 38 to the frame 14. The securing mechanism 22 is fixed to the frame 14 of the vehicle hitch 10, and receives the second extremity 24 of the power transmission coupler 20.

The affixing members 32a, 32b, 32c, 32d and 32e of the securing mechanism 22 define a perimeter 42 of an aperture. Furthermore, as shown on FIG. 9, at least one of the affixing members preferably located substantially in a center of the affixing members, i.e. affixing member 32c, defines a greater perimeter than the other affixing members 32a, 32b, 32d and 32e. When affixed to the frame 14, the affixed member 32c with greater perimeter than the other affixed members 32a, 32b, 32d and 32e defines a slot for receiving a position adjustment mechanism 40.

The position adjustment mechanism 40 allows planar movement of the second extremity 24 of the power transmission coupler 20 within the securing mechanism 22. For doing so, the position adjustment mechanism 40 is installed in the slot defined by the affixing members 32a, 32b, 32c, 32d and 32e. The position adjustment mechanism 40 has a perimeter defining a shape similar to but smaller than the perimeter of the affixing member 32c. Furthermore, to ensure that the position adjustment mechanism remains within the securing mechanism, its perimeter is larger than the perimeter of the affixing members 32a, 32b, 32d and 32e.

Thus the position adjustment mechanism 40 moves in plane defined by the affixing members in the aperture 42 of the affixing member 32c, while being retained in the securing mechanism 22 by the other affixing members 32a, 32b, 32d and 32e. The position adjustment mechanism 40 may be a plate as shown on FIGS. 8 and 9, of a similar shape as the perimeters of the affixing members. However, the position adjustment mechanism 40 could alternatively be of a different shape than the perimeter 42 of the affixing members, while still being adapted to be installed within the securing mechanism, and move in the plane defined therein.

The position adjustment mechanism 40 surrounds the second extremity 24 of the power transmission coupler 20. To reduce friction, the second extremity 24 is inserted in one or several annular bearings 44, which are then inserted in the position adjustment mechanism 40.

Although shown shaped as a disk, the position adjustment mechanism 40 could have various shapes, and not necessarily be flat. The position adjustment mechanism could be made of metal, plastic, brass, composite material, aluminum, or any other material adapted to support the mechanical constraints encountered by the position adjustment mechanism during operation.

Figure 10:
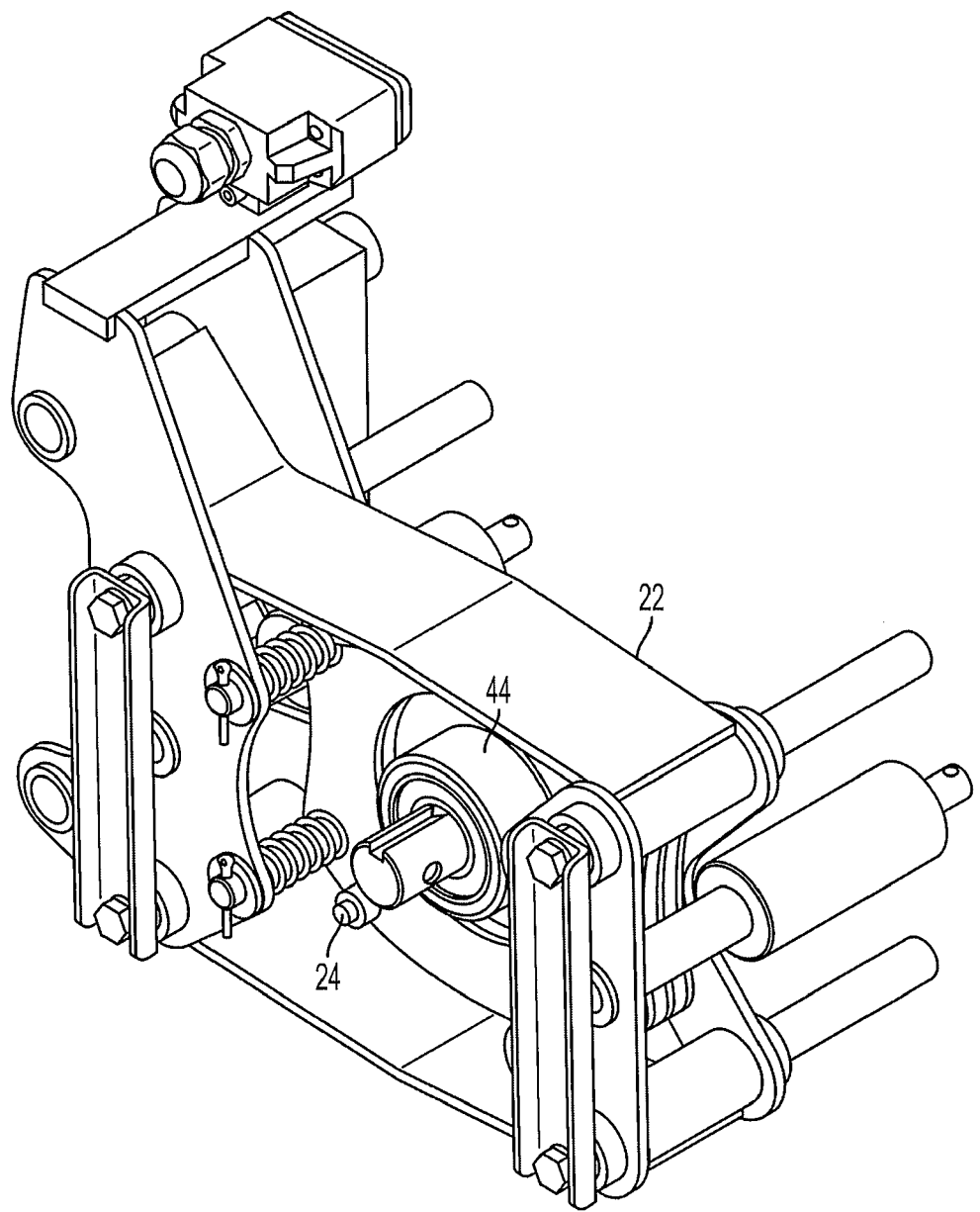
FIG. 10 is a rear perspective view of the present PTO coupler with a compression adjustment mechanism.
Figure 11:
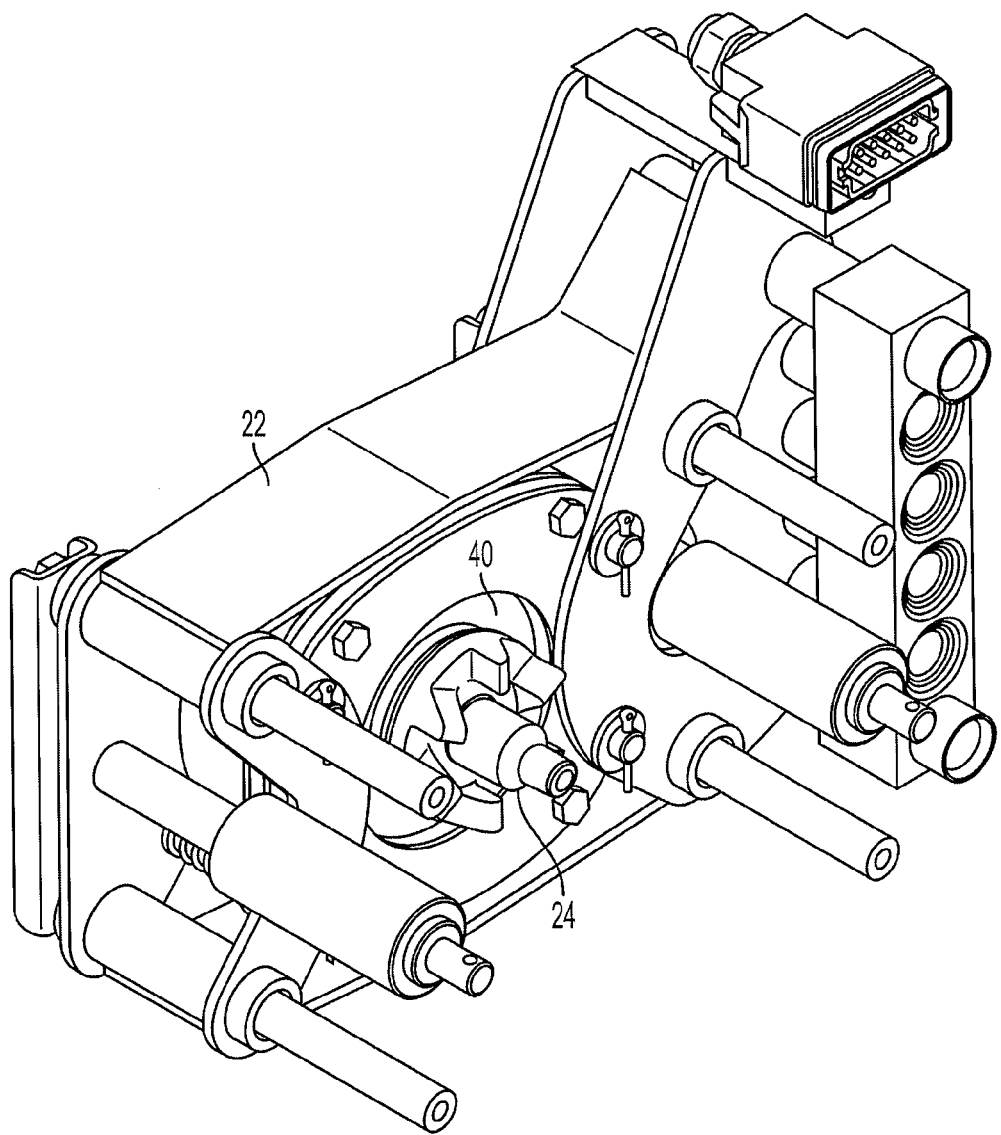
FIG. 11 is a front perspective view of the present PTO coupler with the compression adjustment mechanism.
Figure 12:
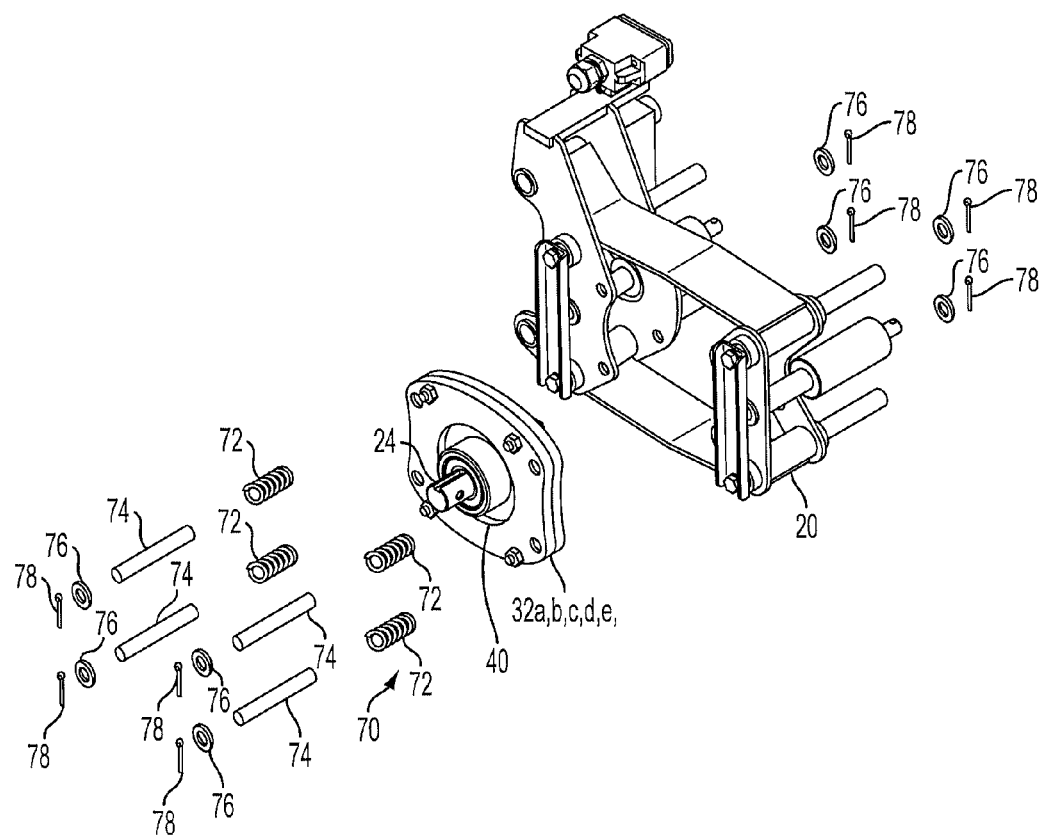
FIG. 12 is an exploded view of the present PTO coupler with the compression adjustment mechanism.

Reference is now made to FIGS. 10, 11 and 12 which are perspective rear view, front view and exploded view of the present PTO coupler with compression adjustment mechanism 70. The position adjustment mechanism 40 further comprises the compression adjustment mechanism 70 for adjusting pressure received by the power transmission coupler 20 during operation, while further providing adjustment of the PTO coupler 18 in a direction perpendicular to the planar adjustment provided by the position adjustment mechanism 40. The compression adjustment mechanism 70 is hereby realized by a plurality of springs, pins 74, washers 76 and locking pins 78. However, the present compression adjustment mechanism 70 is not limited to such an implementation, which could be replaced by any of the following: hydraulic means, magnetic means, pneumatic means, and various types and combinations of springs or resilient materials In a particular aspect, the present compression adjustment mechanism 70 is adapted for allowing movement of the power transmission coupler 20 in the securing mechanism 22 in a direction perpendicular to the planar movement provided by the position adjustment mechanism 40. For smooth operation, the compression adjustment mechanism provides movement over a distance D, equal to the compression length of the springs, which may also be made slightly greater than a length of the teeth 26. Additionally, the pressure exerted by the compression adjustment mechanism 70 on the power transmission coupler 20 is preferably sufficient to assist in engaging the power transmission coupler 20 to the power mechanism 16 of the implement, but should not be greater than a predetermined security threshold.

The present PTO coupler has been described by way of preferred embodiments. It should be clear to those skilled in the art that the described preferred embodiments are for exemplary purposes only, and should not be interpreted to limit the scope of the present PTO coupler. The scope of the present PTO coupler should be defined by reference to the appended claims, which clearly delimit the protection sought.

What is claimed is:

1. A Power Take Off (PTO) coupler comprising:
   a power transmission coupler, the power transmission coupler having a first extremity adapted to be affixed to a vehicle shaft, and a second extremity adapted to engage a power mechanism of an implement; and
   a securing mechanism for fixedly securing the second extremity of the power transmission coupler to a hitch, the securing mechanism comprising a position adjustment mechanism and a slot defining a perimeter of an aperture, the position adjustment mechanism being installed in the slot and allowing planar movement of the power transmission coupler within the securing mechanism;
   characterized in that the second extremity is provided with a tapered male connection and the power mechanism is provided with a complementary tapered female connection adapted to receive the male connection.

2. The PTO coupler of claim 1, wherein the position adjustment mechanism has a perimeter defining a shape similar and smaller to the aperture.

3. The PTO coupler of claim 2, wherein the position adjustment mechanism is a plate surrounding the power transmission coupler.

4. The PTO coupler of claim 1, wherein the position adjustment mechanism further comprises a compression adjustment mechanism for adjusting pressure and axial position received by the power transmission coupler.

5. The PTO coupler of claim 1, wherein the PTO is configured such that teeth of the second extremity and teeth of the power mechanism do not get into contact with complementary bases, when the tapered male connection is in contact with the tapered female connection.

6. A vehicle hitch comprising:
   a frame adapted to connect with a corresponding hitch of an implement;
   a power transmission coupler, the power transmission coupler having a first extremity adapted to be affixed to a vehicle shaft, and a second extremity adapted to engage a power mechanism of the implement; and
   a securing mechanism for fixedly securing the second extremity of the power transmission coupler to the frame, the securing mechanism comprising a position adjustment mechanism and a slot defining a perimeter of an aperture, the position adjustment mechanism being installed in the slot and allowing planar movement of the power transmission coupler within the securing mechanism;
   characterized in that the second extremity is provided with a tapered male connection and the power mechanism is provided with a tapered female connection adapted to receive the male connection.

7. The vehicle hitch of claim 6, wherein the position adjustment mechanism has a perimeter defining a shape similar and smaller to the aperture.

8. The vehicle hitch of claim 7, wherein the position adjustment mechanism is a plate surrounding a section of the power transmission coupler proximate to the second extremity.

9. The vehicle hitch of claim 6, wherein the position adjustment mechanism further comprises a compression adjustment mechanism for adjusting pressure and axial position of the power transmission coupler.

10. The vehicle hitch of claim 6, wherein the PTO is configured such that teeth of the second extremity and teeth of the power mechanism do not get into contact with complementary bases, when the tapered male connection is in contact with the tapered female connection.

* * * * *